US006866585B2

(12) United States Patent
Muir

(10) Patent No.: US 6,866,585 B2
(45) Date of Patent: Mar. 15, 2005

(54) GAMING GRAPHICS

(75) Inventor: Robert Muir, Rosebery (AU)

(73) Assignee: Aristocrat Technologies Australia Pty Ltd (AU)

(*) Notice: Subject to any disclaimer, the term of this patent is extended or adjusted under 35 U.S.C. 154(b) by 185 days.

(21) Appl. No.: 10/039,687

(22) Filed: Oct. 25, 2001

(65) Prior Publication Data
US 2002/0111212 A1 Aug. 15, 2002

(30) Foreign Application Priority Data

Oct. 25, 2000 (AU) .............................................. PR1006

(51) Int. Cl.[7] .................................................. A63F 9/24
(52) U.S. Cl. .......................................... 463/31; 463/43
(58) Field of Search .............................. 463/30–33, 43; 345/419, 422, 530–538, 545, 629–630, 636

(56) References Cited

U.S. PATENT DOCUMENTS 5,920,687 A * 7/1999 Winner et al. ............... 345/422
6,359,619 B1 * 3/2002 Waters et al. ............... 345/426

* cited by examiner

Primary Examiner—Kim Nguyen
(74) Attorney, Agent, or Firm—Fish & Richardson P.C.

(57) ABSTRACT

A gaming machine graphics package includes a storage device for storing data relating to non-varying parts of an image, the non-varying parts of the image being independent of an outcome of a game played on the gaming machine. An image generator generates simulated three-dimensional additional parts of the image, the additional parts being dependent on the game outcome. A compositor merges the non-varying parts of the image and the additional parts of the image to provide to the player a composite image relating to the game outcome.

31 Claims, 3 Drawing Sheets

GAMING GRAPHICS

FIELD OF THE INVENTION

This invention relates to a gaming machine. More particularly, the invention relates to a gaming machine graphics package and to a method of presenting to a player a game outcome of a game played on a gaming machine.

BACKGROUND TO THE INVENTION

Traditionally, there are several ways to provide high quality graphics in gaming machines. These include:

Images which are stored in EPROM or hard disk and which are played back on the screen using traditional 2D techniques. Animations are commonly used to improve the presentation and some products store large amounts of animation on hard disk drive. Animations may be generated from 3D modelling software and pre-rendered into a 2D animation; or Real-time 3D which is used to generate images from 3D models stored in memory.

In theory, the same scenes can be generated by either method. Pre-rendered graphics are produced ahead of time and played back like a video. The 3D system recreates the image in real-time. The 2D system has the potential for superior image quality at the cost of flexibility. The real-time 3D system has flexibility, but poorer image quality.

There are many effects that are difficult or impossible to pre-render into 2D, yet are easy to perform in real-time 3D. On the other hand there are many effects that are easy to pre-render, yet very hard or impossible to perform with real-time 3D.

An example of the flexibility of 3D is the rippling water effect, in which, after a win, the entire screen is rippled as if it were water. This is very simple to achieve in 3D, as the screen is simply divided into a large number of polygons which are moved in a wave. It does not matter what image is overlaid on the polygon mesh. The same effect is effectively impossible to pre-render because of the large number of possible stopping positions on the reel strips (perhaps 100 million).

An example of the quality of 2D is a photograph or video of, say, a person. It is not possible to model a person convincingly in real-time 3D, yet it is very simple to take a photograph or video.

SUMMARY OF THE INVENTION

According to a first aspect of the invention, there is provided a gaming machine graphics package, the graphics package including a storage device for storing data relating to non-varying parts of an image, the non-varying parts of the image being independent of an outcome of a game played on the gaming machine;

an image generating means for generating simulated three-dimensional additional parts of the image, the additional parts being dependent on the game outcome; and a compositing means for merging the non-varying parts of the image and the additional parts of the image to provide to the player a composite image relating to the game outcome.

"Non-varying" as used in this specification means, unless the context clearly indicates otherwise, that part of an image which remains the same from game to game irrespective of the game outcome. However, in the game, the image may vary spatially and/or temporally.

Thus, non-varying parts of the image which are the same for all possible outcomes may be pre-rendered and stored in the storage device. In so doing a high quality reproduction of the non-varying parts of the image can be obtained.

The simulated three-dimensional images may be generated using 3D computer rendering software. Preferably, the software used is a ray-tracing program.

From the game outcome, the relevant simulated three-dimensional images may be generated and mapped to appropriate locations in the non-varying parts of the image to be composited and displayed to the player as a composite image dependent on the game outcome.

Various compositing techniques may be used for compositing the pre-rendered, non-varying parts of the image and the real time simulated three-dimensional parts of the image.

Hence, for example, the compositing means may be a Z-buffer compositor. This technique has the advantage that the real time 3D objects to be composited may be partially decoupled from the original 3D model used to create the image and are automatically composited into the image.

The pre-rendered image may be created with a Z-buffer depth value for each pixel in every scene of the image. For computer generated images this is usually output from tools used to create the image.

The Z-buffer data may be loaded into a real time 3D video card for each frame of the image, the additional 3D objects being composited into the image using 3D techniques and using the Z-buffer data loaded with the image. The 3D objects may appear in the image according to their Z positions. Normally the 3D objects and pre-rendered image share the same basic environment, with lighting, camera positions, etc, to produce a consistent look to the image, as if they had been produced together.

In another embodiment, the compositing means may employ an alpha channel. This approach requires that the real time 3D objects be created at exactly the same place they will occupy in the composite image. However, the advantage of the alpha channel approach is that it requires less data than a Z-buffer and that the 3D objects are blended into the rendered image using alpha channel values created by the rendering program.

The image may be separated into those parts which are pre-rendered and those that are drawn using real time 3D. When an animation image is created, each pixel in a final output may be output with additional information about alpha-channel values and a material value or object identification (ID). The material value or object ID may be used to identify those pixels which are part of the pre-rendered image and those which will be generated in real time by a 3D engine.

A post-processing stage in an output file may modify the image alpha channel to mask out or include the real-time 3D parts of the image. For example, a pixel which is entirely generated by pre-rendering may have an alpha-value which is non-transparent, such that the pixel on display is 100% from the pre-rendered image. A pixel which is entirely from the real time 3D image may have an alpha-channel value such that the displayed pixel is 100% from the real-time image.

Some pixels in the original image may have an intermediate alpha value, better to merge the separate elements of the image together. These values are preserved and produce higher quality image composition. When creating the image, the real-time parts of the image may be generated using a pure white surface. Effects applied to this surface may also be applied to the real-time generated pixels in the final output.

In respect of either technique, some properties of the real-time 3D objects may be pre-rendered and combined with the 3D object as it is being drawn on screen. For example a shadow may be cast on the 3D object. The shadow may then be created, during rendering, on to a white place holder representing the 3D object.

According to a second aspect of the invention, there is provided a method of presenting a game outcome of a game played on a gaming machine to a player, the method including the steps of storing data relating to non-varying parts of an image in a storage device, the non-varying parts of the image being independent of an outcome of a game played on the gaming machine;

generating simulated three-dimensional additional parts of the image, the additional parts being dependent on the game outcome; and compositing the non-varying parts and the additional parts of the image to provide a composite image relating to the game outcome to the player.

The method may include rendering the simulated 3D images in real time and compositing them with the non-varying images in real time.

The method may further include, prior to displaying a game outcome and its associated images to the player, determining the game outcome.

From the game outcome, the method may include generating the relevant simulated three-dimensional images and mapping them to appropriate locations in the non-varying parts of the image to be composited and displayed to the player as a composite image dependent on the game outcome.

In one embodiment of the invention, the method may include using Z-buffer compositing. Hence, the method may include creating a pre-rendered image with a Z-buffer depth value for each pixel in every scene of the image.

The method may then include loading the Z-buffer data into a real time 3D video card for each frame of the image. The method may include compositing additional 3D objects into the image using 3D techniques and using the Z-buffer data loaded with the image.

In another embodiment of the invention, the method may include creating an alpha channel as a compositing technique. In this embodiment, the method may include separating the image into those parts which are pre-rendered and those that are drawn using real time 3D.

The method may therefore include outputting each pixel in a final output with additional information about alpha-channel values and a material value or object identification (ID). Then, the method may include using the material value or object ID to identify those pixels which are part of the pre-rendered image and those which will be generated in real time by a 3D engine.

The method may include using a post-processing stage in an output file to modify the image alpha channel to mask out or include the real-time 3D parts of the image.

Further, the method may include pre-rendering some properties of the real-time 3D parts of the image and combining them with the 3D parts of the image as the image is being drawn on screen.

BRIEF DESCRIPTION OF THE DRAWINGS

The invention is now described, by way of example, with reference to the accompanying drawings in which.

DETAILED DESCRIPTION OF THE INVENTION

Figure 1:
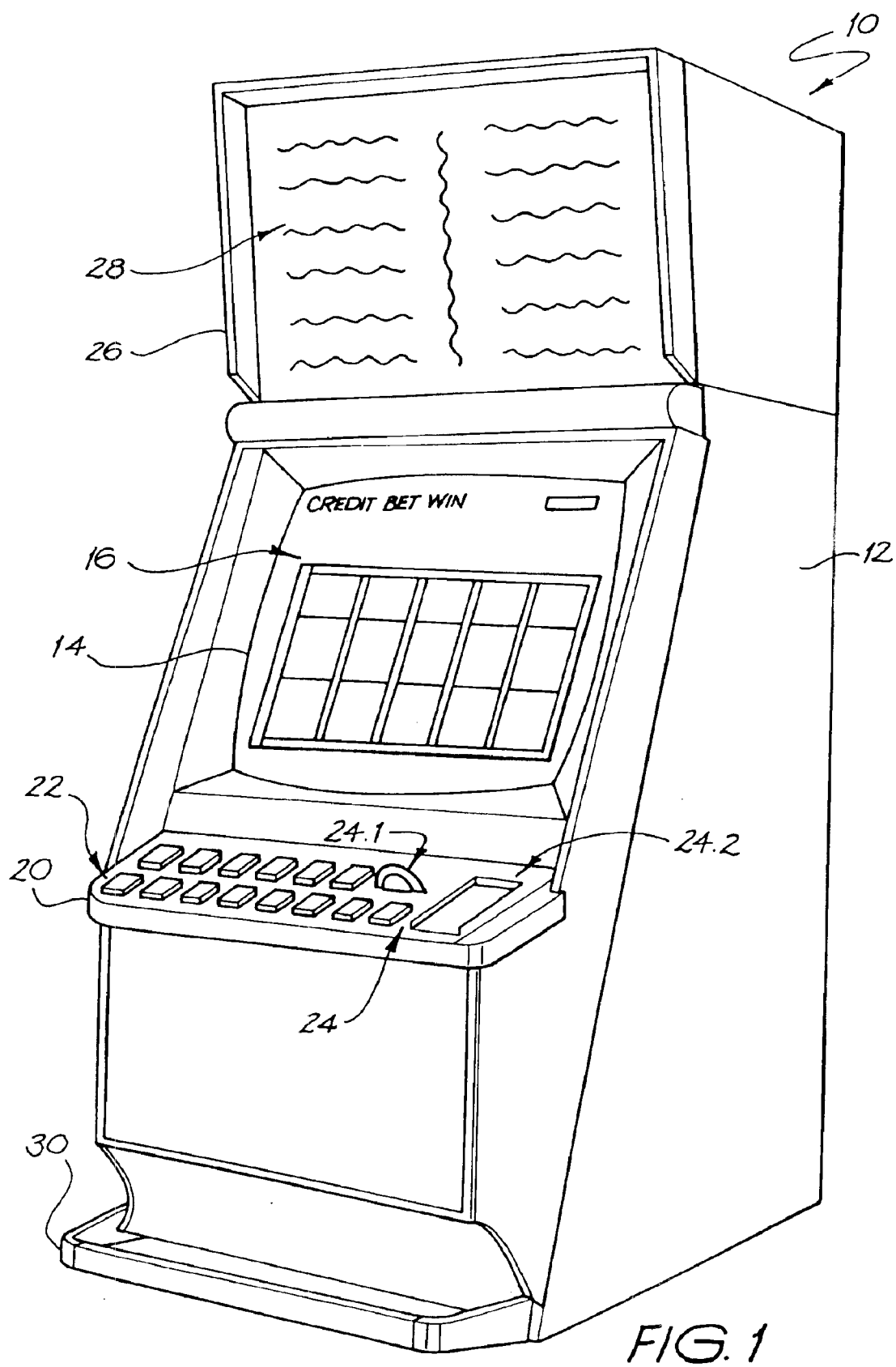
FIG. 1 shows a three dimensional view of a gaming machine, including a graphics package in accordance with the invention.

In FIG. 1, reference numeral 10 generally designates a gaming machine, including a game, in accordance with the invention. The machine 10 includes a console 12 having a video display unit 14 on which a game 16, such as a spinning reel game having a video simulation of spinning reels 18, is played, in use.

A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
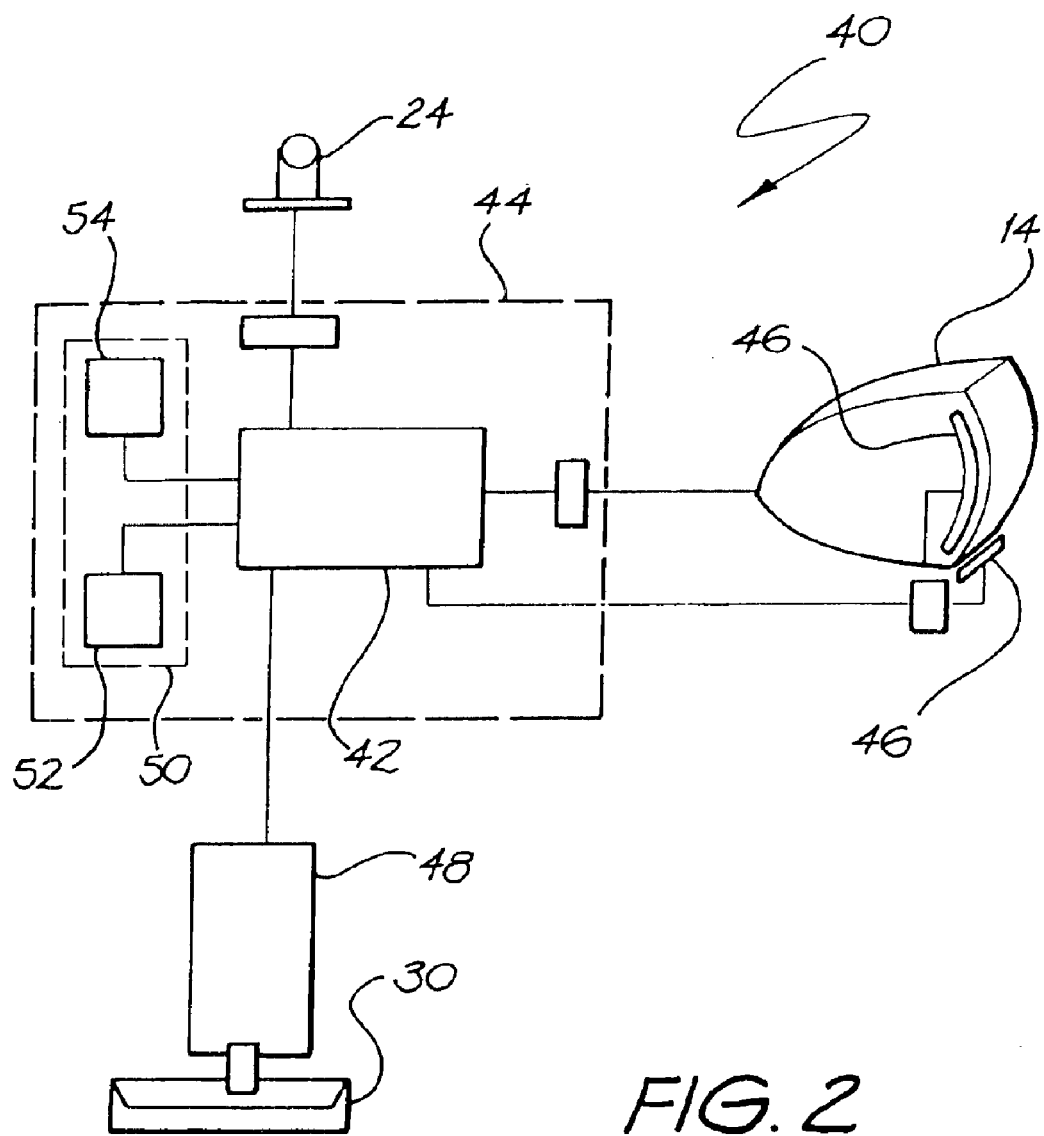
FIG. 2 shows a block diagram of a control circuit for the gaming machine of FIG. 1.

Referring now to FIG. 2 of the drawings, a control means or control circuit 40 is illustrated. A program which implements the game and user interface is run on a processor 42 of the control circuit 40. The processor 42 forms part of a controller 44 which drives the screen of the video display unit 14 and which receives input signals from sensors 46. The sensors 46 include sensors associated with the bank 22 of buttons and touch sensors mounted in the screen 16. The controller 44 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

The controller 44 drives a payout mechanism 48 which, for example, may be a coin hopper for feeding coins to the coin tray 30 to make a pay out to a player when the player wishes to redeem his or her credit.

The controller 44 includes a graphics package 50 which is operated under the control of the processor 42. The graphics package 50 includes a mass storage device in which pre-rendered data relating to non-varying parts of an image to be displayed on the screen of the video display unit 14 are stored. Further, the graphics package 50 includes an image generating means or image generator 54. The image generator 54 generates simulated three-dimensional (3D) additional parts of the image. These additional parts of the image are dependent on the outcome of the game 16 played on the gaming machine 10.

The image generator 54 includes a compositor which composites data from the storage device 52 and the image generator 54 to provide a composite image which is displayed on the screen of the video display unit 14, the composite image, including the real-time rendered 3D data and which is representative of the game outcome.

Generally, the part of the image which is the same for all possible outcomes or animations is pre-rendered using appropriate pre-rendering tools and is stored in the storage device 52. Those parts of the image which depend on the game outcome are generated using real-time 3D techniques via the image generator 54. The two parts of the image are composited together to present the game outcome to the player.

For example, in the case of an electronic gaming simulation of a roulette wheel, the variable part of the animation are the numbers on the roulette wheel. The rest of this image is pre-generated as a high quality animation and the numbers are then merged with the wheel during playback.

A further example is illustrated in FIGS. 3–6 of the drawings where two dice 56 (FIG. 6) are shown. The dice 56 may be generated, for example, as a result of a special feature arising from the underlying base, spinning reel game 16.

For the best visual quality of the images of the dice 56, an animation is rendered of the dice being thrown using a suitable, commercially available ray-tracing program. The animation might also contain a table (not shown) on which the dice 56 are thrown, hands to perform the throwing, bouncing and rolling of the dice, etc.

It will be appreciated that, for two dice, there are 36 possible outcomes and this increases exponentially for the number of dice available in the animation. Accordingly, the number of animations or outcomes quickly becomes difficult to pre-render and store.

Also, for each possible outcome it may be desirable to generate several different ways in which the dice 56 and camera move to arrive at that outcome. This further increases the number of animations for which storage is required.

Using the technique of the invention, those parts of the image which are independent of the outcome are pre-rendered and those parts which depend on the outcome are generated in real-time using 3D techniques, and both are composited into the image in real-time as the animation plays.

In the example shown in FIGS. 3–6 of the drawings, the animation of the dice 56 being thrown on to the table, the dice 56 bouncing and rolling and the final resting position of the dice 56 is pre-rendered with high quality. The actual faces of the dice are drawn in real-time 3D and composited into the animations in real-time.

Figure 3:
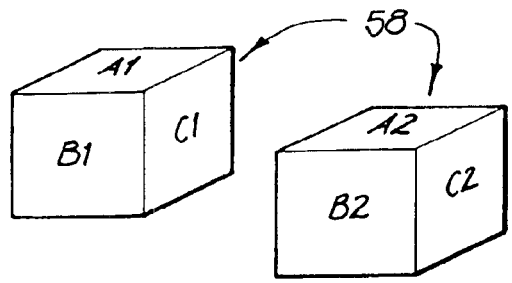
FIG. 3 shows a representation of two cubes used in the generation of representations of two dice.
Figure 4:
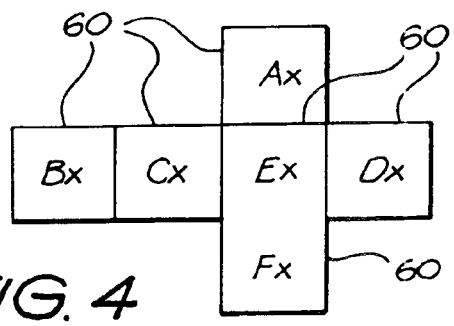
FIG. 4 shows a representation of one of the cubes with all its faces visible.

As shown in FIG. 3 of the drawings, two cubes 58 are pre-rendered without any dots applied to their faces. As will be appreciated, each cube 58 has, in effect, six faces 60, as shown in FIG. 4 of the drawings.

Figure 5:
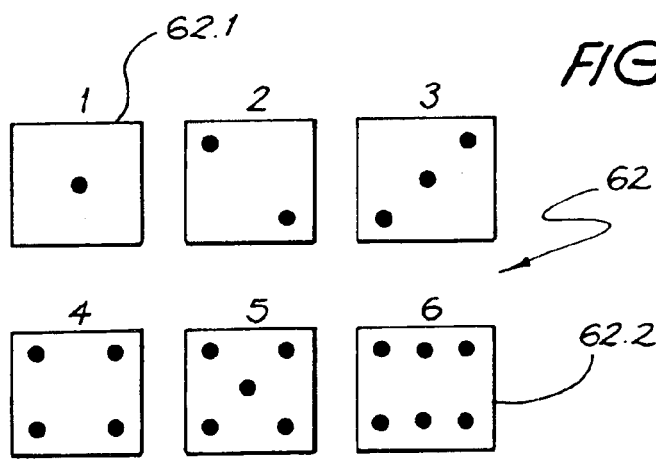
FIG. 5 shows the possible graphical images which can be applied to each of the faces of the cubes of FIG. 3.

The possible images 62 which can be applied to each face 60 of the cubes 58 are shown in FIG. 5 of the drawings.

Prior to showing the game to the player on the screen of the video display unit 14, the outcome of the game is determined by the controller 44. A mapping between the faces 60 of the cubes 58 and the images 62 to be displayed is created. If, for example, it is desired to show the first die 56.1 having a "1" on its face A1 and the second die 56.2 having a "6" on its face A2, then face A1 has image 62.1 mapped to it and face A2 has image 62.2 mapped to it. The other faces of the dice 56 are not important to the outcome of the game and can be selected from any of the remaining graphical images 62.

Figure 6:
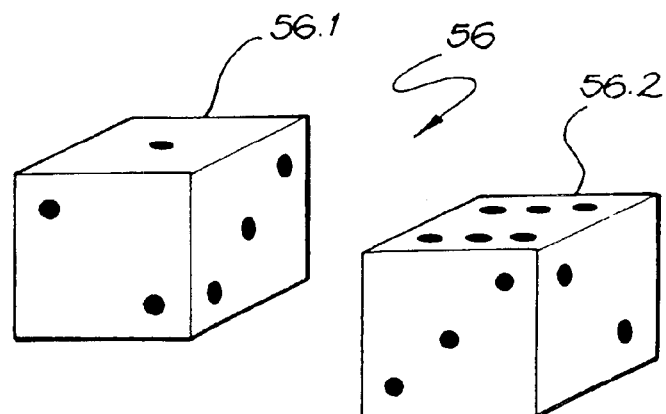
FIG. 6 shows the two dice after application of the relevant graphical images from FIG. 5.

As the animated image is shown to the player, the dice 56 are composited into the scene. More particularly, the animation of the cubes 58 being thrown, etc, has been pre-rendered and is extracted from the storage device 52. The animations of the graphical images 62 are extracted from the image generator 54 and, via the compositor of the processor 42, are composited on to the relevant faces of the cubes 58 so that, when the dice 56 come to rest as shown in FIG. 6 of the drawing, the relevant faces of the dice 56 are in the correct position for the predetermined outcome of the game. Any suitable compositing technique may be employed in the processor 42.

In one embodiment, Z buffer compositing can be used. In this case, the cube 58 of each die 56 is pre-rendered and is allocate a Z buffer depth value for each pixel in every scene of the image. These Z buffer data are loaded into a real time video card of the controller 44 for each frame of the image. The selected faces 62 of the dice 56 are composited into the image using 3D techniques and using the stored Z-buffer data. It is to be noted that the cubes 58 of the dice 56 and their faces 62 share the same basic environment, with lighting, camera positions, etc, to produce a consistent look to the image, as if they had been produced together.

In another embodiment, the compositor of the processor 42 may employ a alpha channel. This approach requires that the real time 3D objects be created at exactly the same place they will occupy in the composite image. However, the advantage of the alpha channel approach is that it requires less data than a Z-buffer and that the 3D objects are blended into the rendered image using alpha channel values created by the rendering program.

The image is separated into those parts, being the cubes 58 of the dice 56, which are pre-rendered and those parts, being the faces 62 of the dice 56, that are drawn using real time 3D. In other words, in this case, everything except the faces 62 of the dice 56 are pre-rendered. When an animation image is created, each pixel in a final output is output with additional information about alpha-channel values and a material value or object identification (ID). The material value or object ID are used to identify those pixels which are part of the pre-rendered images of the cubes 58 and those pixels associated with the faces 62 which will be generated in real time by a 3D engine.

A post-processing stage in an output file modifies the image alpha channel to mask out or include the real-time 3D parts of the image. For example, a pixel which is entirely generated by pre-rendering has an alpha-value which is non-transparent, such that the pixel on display is 100% from the pre-rendered image. A pixel which is entirely from the real time 3D image has an alpha-channel value such that the displayed pixel is 100% from the real-time image. Some pixels in the original image may have an intermediate alpha value, better to merge the separate elements of the image together. These values are preserved in the controller 44 and produce higher quality image composition.

When creating the image, the real-time parts of the image may be generated using a pure white surface. The pre-rendering tool may be used to determine, beforehand, some effects, such as lighting and reflections, that can be applied to the real-time 3D object. In other words, those effects for the real-time 3D objects are pre-rendered and the 3D objects are enhanced with the effects, it being appreciated that the effects may be too complex to calculate in real-time. The objects that are displayed using real-time 3D are represented in the pre-rendering tool by white objects and the effects applied to the white objects during rendering can be extracted and applied to the real-time 3D objects they represent during compositing.

It is an advantage of the invention that a high quality image generating system is provided which does not require an inordinately large amount of data storage capacity.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A gaming machine which includes
    a controller for controlling a game played on the gaming machine and a display for displaying images relating to the game and a game outcome;
    a storage device for storing data relating to non-varying parts of an image the non-varying parts of the image being independent of the game outcome;
    an image generating means for generating simulated three-dimensional additional parts of the image, the additional parts being dependent on the game outcome; and
    a compositing means for merging the non-varying parts of the image and the additional parts of the image to provide to a player a composite image relating to the game outcome.

2. The gaming machine of claim 1 in which the non-varying parts of the image which are the same for all possible outcomes are pre-rendered and stored in the storage device.

3. The gaming machine of claim 2 in which the non-varying parts of the image are generated using 3D computer rendering software.

4. The gaming machine of claim 3 in which, from the game outcome, the simulated three-dimensional additional parts of the image are generated and mapped to appropriate locations in the non-varying parts of the image to be composited and displayed to the player as a composite image dependent on the game outcome.

5. The gaming machine of claim 2 in which the compositing means is a Z-buffer compositor.

6. The gaming machine of claim 5 in which the pre-rendered image is created with a Z-buffer depth value for each pixel in every scene of the image.

7. The gaming machine of claim 6 in which Z-buffer data are loaded into a real time 3D video card for each frame of the image, the simulated additional, three-dimensional parts of the image being generated in real time and being composited into the image using 3D techniques and using the Z-buffer data loaded with the image.

8. The gaming machine of claim 7 in which the simulated additional, three-dimensional parts of the image appear in the image according to their Z positions.

9. The gaming machine of claim 2 in which the compositing mean employs an alpha channel.

10. The gaming machine of claim 9 in which the image is separated into objects, including the non-varying parts of the image, which are pre-rendered and 3D objects, including at least certain portions of the simulated three-dimensional additional parts of the image, that are drawn using real time 3D.

11. The gaming machine of claim 10 in which, when an animation image is created, each pixel in a final output is output with additional information about alpha-channel values and a material value or object identification (ID).

12. The gaming machine of claim 11 in which the material value or object ID is used to identify those pixels which are part of the pre-rendered image and those which will be generated in real time by a 3D engine.

13. The gaming machine of claim 12 in which a post-processing stage in an output file modifies the alpha channel values to mask out or include the real-time 3D parts of the image.

14. The gaming machine of claim 11 in which saws pixels in the animation image have en intermediate alpha value, better to merge the separate objects of the image together.

15. The gaming machine of claim 10 in which, when creating the image, the simulated three-dimensional additional parts of the image are generated using a pure white surface.

16. The gaining machine of claim 15 in which effects applied to the pure white surface are also applied to real-time generated pixels in a final output.

17. The gaming machine of claim 16 in which some other portions of the real-time 3D objects are pre-rendered and combined with at least certain further portions of the real-time 3D objects as the at least certain further portions of the real-time 3D objects are being drawn on screen.

18. A method of presenting a game outcome of a game played on a gaming machine to a player, the method including the steps of
    controlling the game played on the gaming machine and displaying an image relating to the game and the game outcome on a display of the gaming machine;
    storing data relating to non-varying parts of the image in a storage device, the non-varying parts of the image being independent of the game outcome;
    generating simulated three-dimensional additional parts of the image, the additional parts being dependent on the game outcome; and
    compositing the non-varying parts and the additional parts of the image to provide a composite image relating to the game outcome to the player.

19. The method of claim 18 which includes rendering the simulated three-dimensional additional parts of the image in real time and compositing the simulated three-dimensional additional parts of the image with the non-varying parts of the image in real time.

20. The method of claim 18 which includes, prior to displaying the game outcome and its associated images to the player, determining the game outcome.

21. The method of claim 20 which includes, from the game outcome, generating the simulated three-dimensional parts of the image and mapping the simulated three-dimensional parts of the image to appropriate locations in the non-varying parts of the image to be composited and displayed to the player am a composite image dependent on the game outcome.

22. The method of claim 18 which includes using Z-buffer compositing.

23. The method of claim 22 which includes creating a pre-rendered image with a Z-buffer depth value for each pixel in each frame of the image.

24. The method of claim 23 which includes loading the Z-buffer depth values into a real time 3D video card for each frame of the image.

25. The method of claim 24 which includes compositing the simulated three-dimensional additional parts of the image into the image using 3D techniques and using the Z-buffer depth values loaded with the image.

26. The method of claim 18 which includes creating an alpha channel as a compositing technique.

27. The method of claim 26 which includes separating the image into objects, including the non-varying parts of the image, which are pro-rendered and 3D objects, including at least certain portions of the simulated three-dimensional additional parts of the image, that are drawn using real time 3D.

28. The method of claim 27 which includes outputting each pixel in a final output with additional information about alpha-channel values and a material value or object identification (ID).

29. The method of claim 28 which includes using the material value or object ID to identify those pixels which are part of the pre-rendered image and those which will be generated in real time by a 3D engine.

30. The method of claim 29 which includes using a post-processing stage in an output file to modify the alpha channel values to mask out or include the real-time 3D parts of the image.

31. The method of claim 30 which includes pre-rendering some other portions of the real-time 3D objects and combining the other portions of the real-time 3D objects with the at least certain portions of the real-time 3D objects as the at least certain portions of the real-time 3D objects are being drawn on screen.

* * * * *